Nov. 27, 1923.  1,475,463
H. WEIDA
METHOD OF MAKING BATTERY VENTS
Filed Nov. 29, 1921
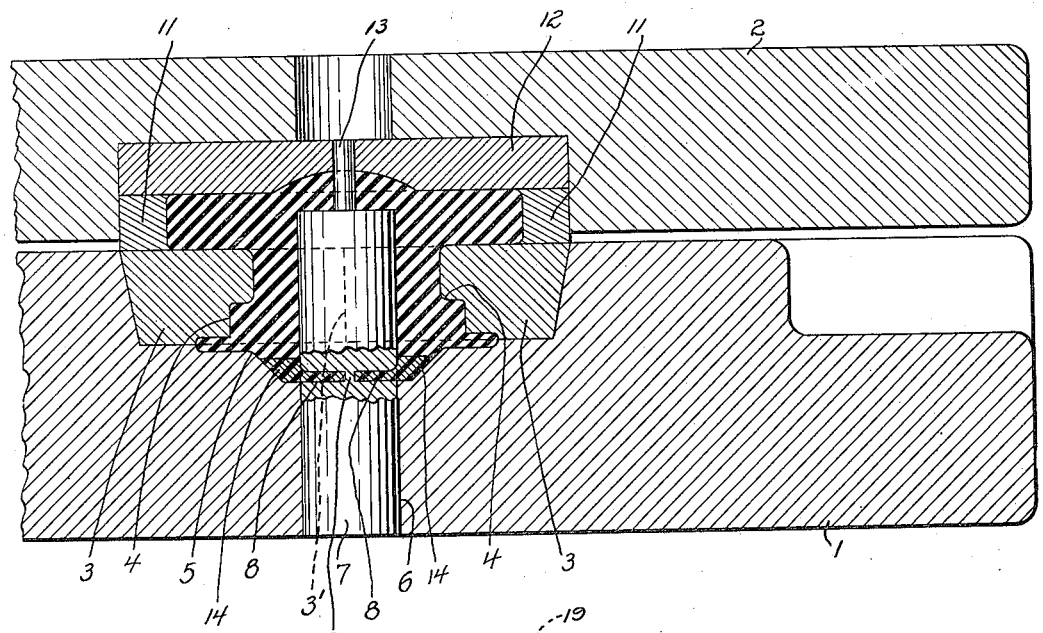
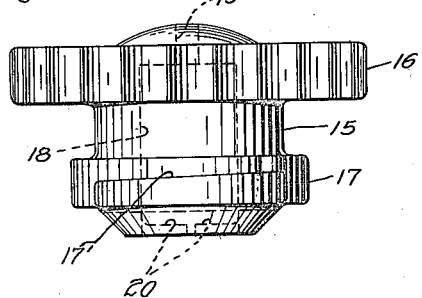
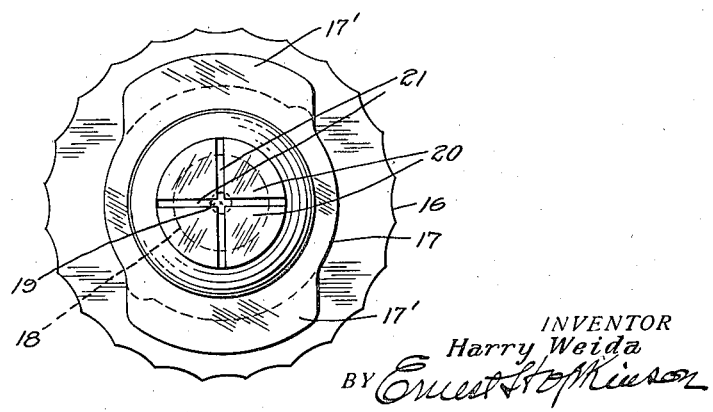
INVENTOR
Harry Weida
BY
HIS ATTORNEY Patented Nov. 27, 1923.

1,475,463

UNITED STATES PATENT OFFICE.

HARRY WEIDA, OF HIGHLAND PARK, NEW JERSEY, ASSIGNOR TO INDIA RUBBER COMPANY, A CORPORATION OF NEW JERSEY.

METHOD OF MAKING BATTERY VENTS.

Application filed November 29, 1921. Serial No. 518,558.

*To all whom it may concern:*

Be it known that I, HARRY WEIDA, a citizen of the United States, residing at Highland Park, county of Middlesex, and State of New Jersey, have invented certain new and useful Improvements in Methods of Making Battery Vents, of which the following is a full, clear, and exact description.

This invention relates to the manufacture of closure caps for batteries, commonly known as battery vents.

An object of the invention is to provide a simple and inexpensive type of battery vent that can be molded and vulcanized complete in one operation and in one piece.

Briefly, the invention consists in a closure cap having an interior separating chamber which is provided with outlets or passages, one outlet or passage at least being formed by a rubber composition of a more distensible character than the main body of the cap to permit the same to be molded complete in one operation and in a mold having a centrally disposed core-pin with notches, the latter forming lips which permit withdrawal of the core-pin that shapes the chamber.

A preferred embodiment of the invention is illustrated in the accompanying drawings in which:—

Fig. 1 is a sectional elevation of one cavity of a gang mold, showing the mass of rubber being molded, Fig. 2 is a side elevation of the molded battery vent, and Fig. 3 is a bottom plan view thereof.

According to my invention, the battery vents are formed in a gang mold having a large number of cavities, a description of one of which will suffice as a disclosure. Referring to Fig. 1, the mold is shown comprising a bottom plate 1 and a top plate 2. In the bottom plate 1 a pair of split bars 3 are provided, their meeting faces between the molding cavities being indicated by the dotted line 3'. Each split bar 3 of a pair thereof is cut away semi-circularly at a number of places, one of which is clearly indicated at 4, to impart the desired configuration to the sides of the article, the bottom plate 1 being machined out as indicated at 5 and provided with a hole 6 for a core-pin 7. The latter is gouged out adjacent the bottom of the molding cavity to form a number of notches which are indicated at 8, the same being separated by webs of metal 9. There are four notches 8 in the core-pin 7, the intervening webs 9 in cross section appear as a cross and insure formation of the rubber that is being molded into prongs 10 that are separated to define a restricted inlet opening shaped like a cross.

Upon the split bars 3, annular rings 11 are placed, these, in turn, supporting cap impression plates 12, which may be suitably engraved with any desired marking. At its upper extremity, the core-pin 7 is provided with a reduced end 13, which is received in a hole in the cap impression plates 12, and thereby the parts are properly centered. It will be understood that the rings 11 and cap impression plates 12 are received in an opening provided in the top plate 2.

In forming the article, the molded parts are assembled, as shown in Fig. 1, with the exception of the top plate 2 and cap impression plates 12, then a ring of soft rubber is dropped into each of the molding cavities about the core-pin 7, being of a size and cross-section to make the lower end of the cap, which is indicated by the hatching 14. After this soft rubber ring has been snugly seated about the core-pin 7, a plug of relatively hard rubber is introduced and the cap impression plates 12 and the top plate 2 are assembled and brought down with a low pressure until sufficiently heated to permit application of a high pressure and consequent complete closure of the mold.

The vulcanized closure cap or battery vent, see Figs. 2 and 3, has a body portion 15 with top and base flanges 16 and 17, respectively, and is provided with an internal trapping and separating chamber 18 vented at its upper end by a hole 19 and through its bottom end wall by prongs or lips 20 of any suitable number and shape, preferably, as shown, four in number and spaced apart to define a cross-shaped passage or inlet 21 constituting a restricted port for the entrance of mingled liquid and gas into the separating chamber 18. The battery vent may be suitably formed with threads, or otherwise, at any suitable place in order to facilitate its attachment to a battery jar, for instance, as shown, by locking-lugs 17' formed on wing-like extensions of the base flange 17.

The product is a one-piece or integral closure cap, the prongs or lips 20 of which are of vulcanized rubber composition more distensible than the rest or main body of the vent although, of course, similar zones of soft rubber might be employed elsewhere for other purposes. Preferably, I obtain this greater distensibility of the lips 20 by incorporating less sulphur in the composition that is to form them. The hole 19 in the top of the closure is preferably molded in the same operation as the body of the vent, but not necessarily, as the top of the closure cap might be molded solid and afterwards drilled or punched to form the aperture. This, however, would necessitate a second operation and add unnecessarily to the expense of manufacture.

In the foregoing, I have disclosed a preferred embodiment of my invention and the underlying principles thereof. It is to be understood that the broad underlying method may be practiced in molds of various forms and with core-pins shaped with one or any number of notches, the only limitation being that the radial depth of the notch or notches in the core-pin must be proportioned to the distensibility of the rubber composition that is to flow into the same so as to permit withdrawal of the core-pin which is to form the internal chamber in the article. The invention is not confined to the manufacture of battery vents and may be used for making any article whose molding requirements are similar.

Having thus described my invention, what I claim and desire to protect by Letters Patent is:

1. That method of making a substantially hard rubber article in a cavity mold with a notched core-pin, which consists in, forming the article by vulcanization in the mold from hard rubber composition except in the region of the core-pin where notched in which region the compound is of a composition sufficiently distensible after vulcanization to permit withdrawal of the core-pin and subsequently removing the core-pin.

2. That method of making a substantially hard rubber article in a cavity mold with a notched core-pin, which consists in, positioning a mass of rubber composition vulcanizable in a distensible condition around the core-pin where notched, filling the remaining space in the cavity mold with a mass of rubber composition vulcanizable in a relatively hard condition, closing the mold to confine the masses of rubber composition, and subsequently vulcanizing the article thus confined, and ultimately freeing the article from both the cavity mold and the core-pin.

Signed at New Brunswick, county of Middlesex, and State of New Jersey, this 23rd day of November 1921.

HARRY WEIDA.